United States Patent
Fortier et al.

(10) Patent No.: US 8,766,681 B2
(45) Date of Patent: Jul. 1, 2014

(54) DEVICE AND METHOD FOR A MULTIPLEXOR/DEMULTIPLEXOR RESET SCHEME

(75) Inventors: Guy J Fortier, Ottawa (CA); Jonathan Showell, Ottawa (CA)

(73) Assignee: Applied Micro Circuits Corporation, Sunnyvale, CA (US)

( * ) Notice: Subject to any disclaimer, the term of this patent is extended or adjusted under 35 U.S.C. 154(b) by 0 days.

(21) Appl. No.: 13/607,136

(22) Filed: Sep. 7, 2012

(65) Prior Publication Data

US 2014/0070865 A1   Mar. 13, 2014

(51) Int. Cl.
*H03L 7/06*   (2006.01)

(52) U.S. Cl.
USPC ........... 327/156; 327/147; 327/158; 327/161; 375/373; 375/374; 375/375; 375/376

(58) Field of Classification Search
USPC .......... 327/141, 143, 156, 161; 375/373, 374, 375/375, 376
See application file for complete search history.

(56) References Cited

U.S. PATENT DOCUMENTS 5,150,390 A  *  9/1992  Hayashi et al. ............... 377/116

* cited by examiner

*Primary Examiner* — John Poos

(57) ABSTRACT

Circuit and method for resetting clock circuitry. The circuit includes a chain of cascading units, each of which receives an input of a number of parallel bit streams and outputs a different number of parallel bit streams. A chain of dividers provides one or more divided clock signals to the cascading units, wherein the divided clock signals are based on a gated common clock signal. An asynchronous reset signal is delivered to the dividers, and when asserted sets the dividers to a reset state. A clock source provides an ungated common clock signal. A clock gating circuit generates the gated common clock signal based on the ungated common clock signal, and is configured to hold the gated common clock signal while the asynchronous reset signal is asserted. The clock gating circuit provides the gated common clock signal to the dividers when the asynchronous reset signal is de-asserted.

19 Claims, 5 Drawing Sheets

DEVICE AND METHOD FOR A MULTIPLEXOR/DEMULTIPLEXOR RESET SCHEME

BACKGROUND

In some applications it is necessary to maintain bit alignment after multiplexing or demultiplexing a number of parallel bit streams into a different number of parallel bit streams. For instance, in a coherent fiber optic communication system using quadrature phase-shift keying, differential encoding is used to eliminate phase ambiguities at the receiver. As a result, parallel data output streams which drive the in-phase and quadrature-phase optics must be bit-aligned to maintain the differential encoding.

More specifically, a chain of dividers provide various clock signals to the multiplexor/demultiplexor circuits in order to increase and/or decrease the clocking frequencies throughout the entire circuit. However, the state of each divider generating a local clock at any particular point in time is randomly set, because of the random states of internal circuitry (e.g., flip-flops, etc.) contained within the dividers. In that case, the phase of the data output streams are not aligned. This is especially true in circuits driving in-phase and quadrature-phase optics using parallel data output streams.

One approach to achieve bit alignment is to implement a common clock divider circuit which generates all the required clocks. In a parallel configuration of multiple multiplexors/demultiplexors, the clocks are then distributed to the macros or subunits of the multiplexors/demultiplexors, including clocking units (e.g., dividers), requiring some form of a common clock. Yet another approach is to locally generate the multiple clocks within each macro describing repeated circuit blocks. Thereafter, the phase of the divider outputs generated by each of the macros is then inverted as required to achieve phase matching.

However, in both of the above approaches used to achieve bit alignment, the circuits require increased power to drive multiple long clock networks to ensure the highest quality of the distributed clocks. In addition, there is increased difficulty in designing the routing throughout the multiple clock networks, as separate routing of a clock from a common source to each divider is required. Also, the previous methodologies experience difficulty in scaling to larger number of parallel outputs when performing bit alignment.

Additionally, automated testing of a clocking circuit in a multiplexor/demultiplexor is desired. However, because the clocking circuits of traditional multiplexor/demultiplexor circuits start up in a random state, circuit outputs cannot be easily compared against expected outputs, which makes automated testing difficult.

SUMMARY

Embodiments of the present invention generally relate to circuitry which is capable of resetting timing circuits to a known state in a multiplexor or demultiplexor configuration.

In one embodiment, a circuit for resetting clock circuitry in a single multiplexor/demultiplexor circuit is disclosed. The circuit includes a chain of cascading units, each of which receives an input of a number of parallel bit streams and outputs a different number of parallel bit streams. The circuit includes a chain of one or more dividers for providing one or more divided clock signals to the chain of cascading units. The one or more divided clock signals are based on a gated common clock signal. An asynchronous reset signal is delivered to the chain of one or more dividers. The asynchronous reset signal propagates through the chain of one or more dividers from a downstream side. When the asynchronous reset signal is asserted, dividers in the chain are set to a reset state. The circuit includes a clock source providing an ungated common clock signal. The circuit also includes a clock gating circuit for generating the gated common clock signal based on the ungated common clock signal. The clock gating circuit is configured to hold the gated common clock signal (e.g., in a reset condition) while the asynchronous reset signal is asserted. The clock gating circuit is also configured to provide the gated common clock signal to the chain of one or more dividers when the asynchronous reset signal is de-asserted.

In another embodiment, a reset circuit for resetting clock circuitry in a configuration including multiple multiplexor/demultiplexor circuits arranged in parallel is described. The reset circuit includes a plurality of block circuits arranged in parallel, wherein each block circuit is configured to receive an input of a first number of parallel bit streams and output a second number of parallel bit streams. For instance, the plurality of block circuits may comprise multiple multiplexor/demultiplexor circuits arranged in parallel. Each block circuit comprises a chain of one or more cascading units, wherein each cascading unit is configured to receive a number of parallel bit streams and output a different number of parallel bit streams. Each block circuit also includes a chain of one or more dividers coupled to the chain of one or more cascading units. The dividers are configured for providing one or more divided clock signals to the chain of one or more cascading units that are based on a gated common clock signal. The reset circuit includes an asynchronous reset signal that is delivered to each of the plurality of block circuits. Within each block circuit, the asynchronous reset signal is delivered to a corresponding chain of one or more dividers. When the asynchronous reset signal is asserted, the corresponding chain of one or more dividers is brought to a reset state. The asynchronous reset signal propagates through the corresponding chain of one or more dividers from a downstream side and exits from an upstream side. The reset circuit includes an OR gate that is configured to receive a plurality of asynchronous reset signals exiting from the plurality of block circuits, and output an OR'd asynchronous reset signal. The reset circuit includes a clock gating circuit configured for generating the gated common clock signal based on the ungated common clock signal. The clock gating circuit is configured to hold the gated common clock signal while the OR'd asynchronous reset signal is asserted. In addition, the clock gating circuit is configured to provide the gated common clock signal to corresponding chains of one or more dividers in each of the block circuits when the OR'd asynchronous reset signal is de-asserted In another embodiment, a method for clock synchronization is disclosed. The method includes providing a chain of one or more cascading units, wherein each cascading unit receives an input of a number of parallel bit streams and outputs a different number of parallel bit streams. The method includes providing a chain of one or more dividers coupled to the chain of one or more cascading units. The dividers are configured for providing one or more divided clock signals to the chain of one or more cascading units. The one or more divided clock signals are based on a gated common clock signal. The method also includes delivering an asynchronous reset signal to the chain of one or more dividers, such that the asynchronous reset signal propagates from a downstream side of the divider chain. The method also includes asserting the asynchronous reset signal to set the chain of one or more dividers to a reset state. The method includes providing an ungated common clock signal, such as, that provided from a clock source. The method includes generating a gated common clock signal based on the ungated common clock signal. The method includes holding the gated common clock signal while the asynchronous reset signal is asserted. The method includes releasing the gated common clock signal to the chain of one or more dividers when the asynchronous reset signal is de-asserted.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Accordingly, embodiments of the present disclosure provide a circuit and method for resetting a multiplexor or demultiplexor to a known state using an asynchronous reset signal and methods for implementing the same. When used in conjunction with multiple multiplexor/demultiplexor circuits arranged in parallel, embodiments of the present invention provides for bit-alignment of outputs from the multiplexor/demultiplexor circuits.

Figure 1:
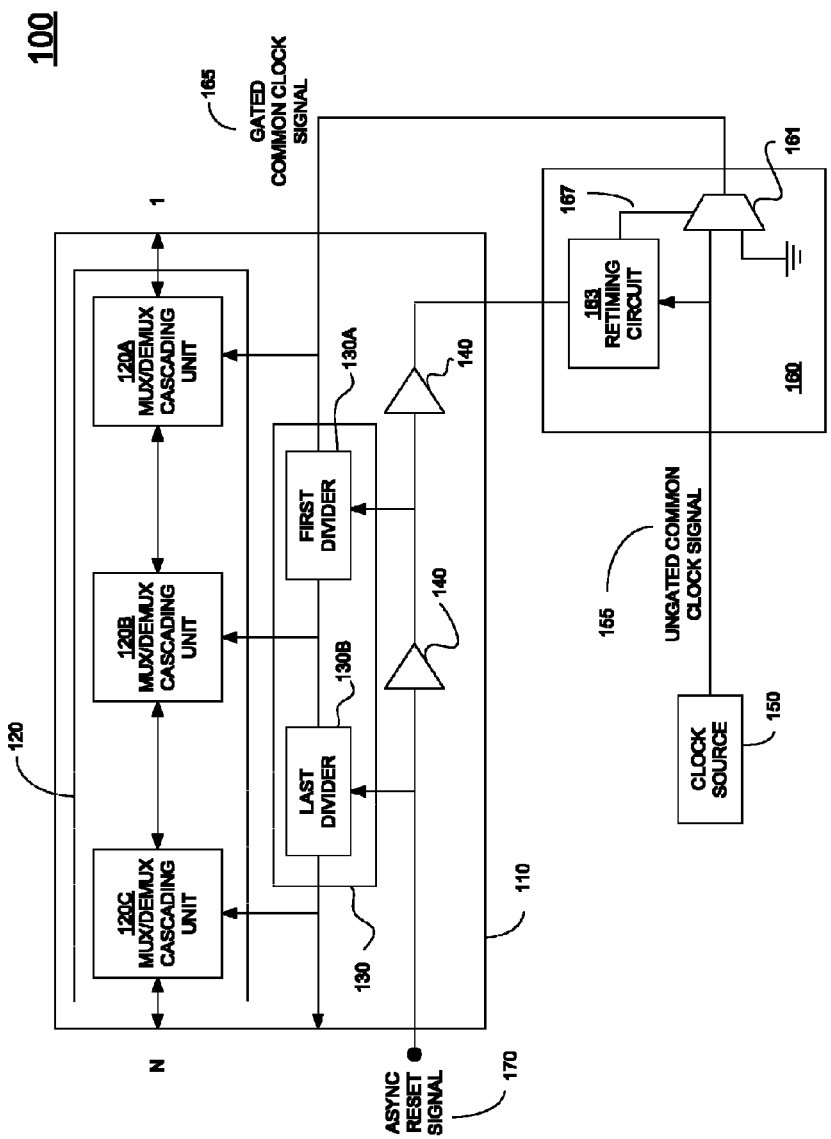
FIG. 1 is a circuit diagram of a reset circuit for resetting clock circuitry as implemented in a single multiplexor/demultiplexor circuit, in accordance with one embodiment of the present disclosure.

FIG. 1 is a circuit diagram of a reset circuit 100 capable of resetting clock circuitry as implemented in a single multiplexor/demultiplexor circuit, in accordance with one embodiment of the present disclosure. In one embodiment, reset circuit 100 is implemented within a multiplexor configured to select one or several analog or digital signals on a number of parallel inputs, and forward the selected input into one of a smaller number of parallel outputs (e.g., a single output). In another embodiment, reset circuit 100 is implemented within a demultiplexor that is configured to perform the opposite function of the multiplexor, and more specifically receive an input signal from a number of parallel inputs or a single input, and forward and distribute the input signal onto one of a larger number of parallel outputs.

The reset circuit 100 is configured to reset the included clocking circuitry (e.g., dividers), such that the state of the clocking circuitry is in a known state before beginning to deliver a clock signal. In that manner, the proper phase of a corresponding clock is known for purposes of signal encoding. As an example, embodiments of the present invention as disclosed in FIG. 1 would be useful for test purposes to guarantee that the multiplexor or demultiplexor always starts up in the same state, such that the outputs can be easily compared against expected outputs.

As shown in FIG. 1, reset circuit 100 includes a chain of one or more cascading units 120 within block 110. For instance, chain 120 may include units 120A-C. Though only three units are shown, any number of cascading units may be configured in the chain of cascading units 120. Each cascading unit receives an input of a number of parallel bit streams and outputs a different number of parallel bit streams.

In one embodiment, each cascading unit 120A-C within block 110 is configured as a multiplexor capable of receiving a number of input, parallel bit streams and distributing them to a smaller number of output, parallel bit streams. As such, the chain of cascading units 120 and block 110 are also configured as a multiplexor. For an illustration of the multiplexing function as shown in FIG. 1, the N inputs to a multiplexor would be inputted from the left side of the chain 120, and the 1 output would be presented on the right side of the chain 120. More specifically, each multiplexing unit (beginning from unit 120C to unit 120B, and then to unit 120A) acts as a multiplexing stage in the chain 120, such that the number of outputs at each stage gradually decreases to 1 output.

In another embodiment, each cascading unit within block 110 is configured as a demultiplexor capable of receiving a number of input, parallel bit streams and distributing them to a larger number of output, parallel bit streams. As such, the chain of cascading units 120 and block 110 are also configured as a demultiplexor. For an illustration of the demultiplexing function as shown in FIG. 1, the "1" input to the demultiplexor would be inputted from the right side of the chain, and the "N" outputs would be presented on the left side of the chain 120. More specifically, each demultiplexing unit (beginning from unit 120A to unit 120B, and then to unit 120C) acts as a demultiplexing stage in the chain 120, such that the number of outputs at each stage gradually increases to "N" outputs.

Reset circuit 100 also includes a chain of one or more dividers 130 coupled to the chain of one or more cascading units 120, wherein the dividers are configured to provide one or more divided clock signals to the chain of one or more cascading units 120. For instance, the chain 130 includes a first divider 130A and a last divider 130B. Though chain 130 includes two dividers, other embodiments support any number of dividers.

The one or more divided clock signals are based on a gated common clock signal that is generated by the clock gating circuit 160. More specifically, the dividers are able to divide an input clock signal of a first frequency characteristic to generate a divided clock signal of a lower second frequency characteristic (e.g., longer period). The generated divided clocks at each divider are then delivered to a corresponding cascading unit. For instance, a gated common clock signal is delivered to the first divider 130 and to the cascading unit 120A. The gated common clock signal is of the highest frequency. The first divider 130A generates a divided clock signal of a lower frequency. As an example, the first divider 130A may divide the frequency by 2. This divided clock signal of a lower frequency is delivered to the cascading unit 120B and to the last divider 130B. the last divider 130B performs a similar function to generate a clock signal of an even lower frequency characteristic (e.g., longest period).

The reset circuit 100 includes and responds to an asynchronous reset signal 170 that is delivered to the chain of one or more dividers 130. When asserted (e.g., HIGH), the asynchronous reset signal 170 sets the chain of one or more dividers 130 to a reset state, such that each divider (e.g., 130A-B is in a reset state). In that manner, the phase of the generated clock signal is known. More specifically, the asynchronous reset signal 170 propagates through the entire chain of dividers 130, such that the clocking circuitry in the dividers are static or in a reset state. In one embodiment, the asynchronous reset signal is asserted for a period sufficient such that all clocking circuitry in the chain 130 returns to its corresponding reset state. As shown, the asynchronous reset signal 170 propagates from a downstream side of the chain of dividers 130, as referenced from the input of the gated common clock signal 165. As shown in FIG. 1, the asynchronous reset signal 170 propagates through the chain of reset buffer 140 to maintain the quality of the asynchronous reset signal 170.

Reset circuit 100 also includes a clock source 150. The clock source generates an ungated common clock signal 155, which is delivered to a clock gating circuit 160.

The clock gating circuit 160 is configured for generating the previously introduced gated common clock signal based on the ungated common clock signal 155. The clock gating circuit is coupled to block 110 and more specifically to the chain of one or more dividers 130 and to the first cascading unit 120A. More specifically, the clock gating circuit 160 is configured to hold the gated common clock signal 165 in a static position (e.g., LOW) while the asynchronous reset signal is asserted (e.g., HIGH). Also, the clock gating circuit is configured to provide the released gated common clock signal 165 to the chain of one or more dividers 130 when the asynchronous reset signal 170 is de-asserted (e.g., LOW). As shown, the gated common clock signal 165 is delivered on the upstream side of the chain 130. Moreover, the reset circuit 100 is designed to release the gated common clock signal 165 after all the dividers in the chain of one or more dividers 130 have come out of their corresponding reset states.

In one embodiment, the propagation of the de-asserted asynchronous reset signal is such that the downstream dividers come out of its corresponding reset state first, or before the upstream dividers. In addition, the clock gating circuit 160 is guaranteed to be the final block to come out of its reset state. A more detailed description of the operations of the reset circuit 100 is provided in the timing diagram 300 of FIG. 3.

As shown in FIG. 1, the clock gating circuit 160 includes a retiming circuit 163 that retimes the asynchronous reset signal 170 using the ungated common clock signal 155. The retiming is performed to guarantee a known timing relationship between the ungated common clock signal 155 and the retimed reset signal 167, such that there is no glitch in the gated common clock signal 165 when the asynchronous reset signal 170 is released. For instance, the retiming circuit is configured to generate a retimed reset signal that is de-asserted such that the gated common clock signal will not be distorted in any way. More specifically, the retimed reset signal is de-asserted to give the clock gating circuit 160, and more specifically the logic unit 161, sufficient set-up time for releasing the gated common clock signal 165 on a rising edge of the ungated common clock 155. This ensures that the first HIGH portion of the waveform that is generated for the gated common clock signal 165 is full.

The retimed reset signal is delivered to the logic unit 161 that provides the clock gating function. In the clock gating circuit 160, a multiplexor is shown as the logic unit 161 for performing the clock gating function. However, other embodiments are well suited to using other logic cells for purposes of performing the clock gating function. The logic unit 161 delivers the gated common clock signal 165 when the retimed asynchronous reset signal is de-asserted (e.g., LOW).

More specifically, the clock gating circuit 160 is coupled to block 110 to deliver the gated common clock signal 165. The highest frequency gated common clock signal 165 only starts toggling after all the dividers in the chain of dividers 130 have come out of corresponding reset states. As shown in FIG. 1, the gated common clock signal 165 is provided to a first cascading unit 120A and to the first divider 130A in the chain of one or more dividers 130. The first divider 130A is configured to provide a divided clock signal to a second cascading unit 120B that is coupled to receive data signals from said first cascading unit 120A.

In addition, the first divider 130A is configured to provide the divided clock signal to the last divider 130B. The last divider 130B performs a similar function as the first divider 130A. Specifically, the last divider 130B receives a clock signal (e.g., the divided clock signal from the first divider), and generates a divided clock signal, which is now twice divided when referenced to the gated common clock signal 165. The divided clock signal is provided to the third cascading unit 120C in the chain 120 that is coupled to receive data signals from the second cascading unit 120B. More particularly, each divider's input clock is guaranteed to be in an initial valid static state when the divider initially comes out of its reset state.

In one embodiment, reset circuit 100 provides that at each divider in the chain 130, on the assertion of the asynchronous reset signal 170, there is no timing requirement relative to its input clock. That is, it does not matter whether or not the divider output cleanly enters the reset state. Also, on the de-assertion of the asynchronous reset signal 170, there is no timing requirement, because there is no input clock signal.

Also, for each divider in the chain 130, the time elapsed before the input clock starts up again after the de-assertion of the asynchronous reset signal is of a sufficient period to guarantee that the reset state is no longer affecting operation. This is accomplished by ensuring the delays through the buffer 140 (e.g., complementary metal-oxide semiconductor [CMOS] buffers) are sufficiently long.

Figure 2:
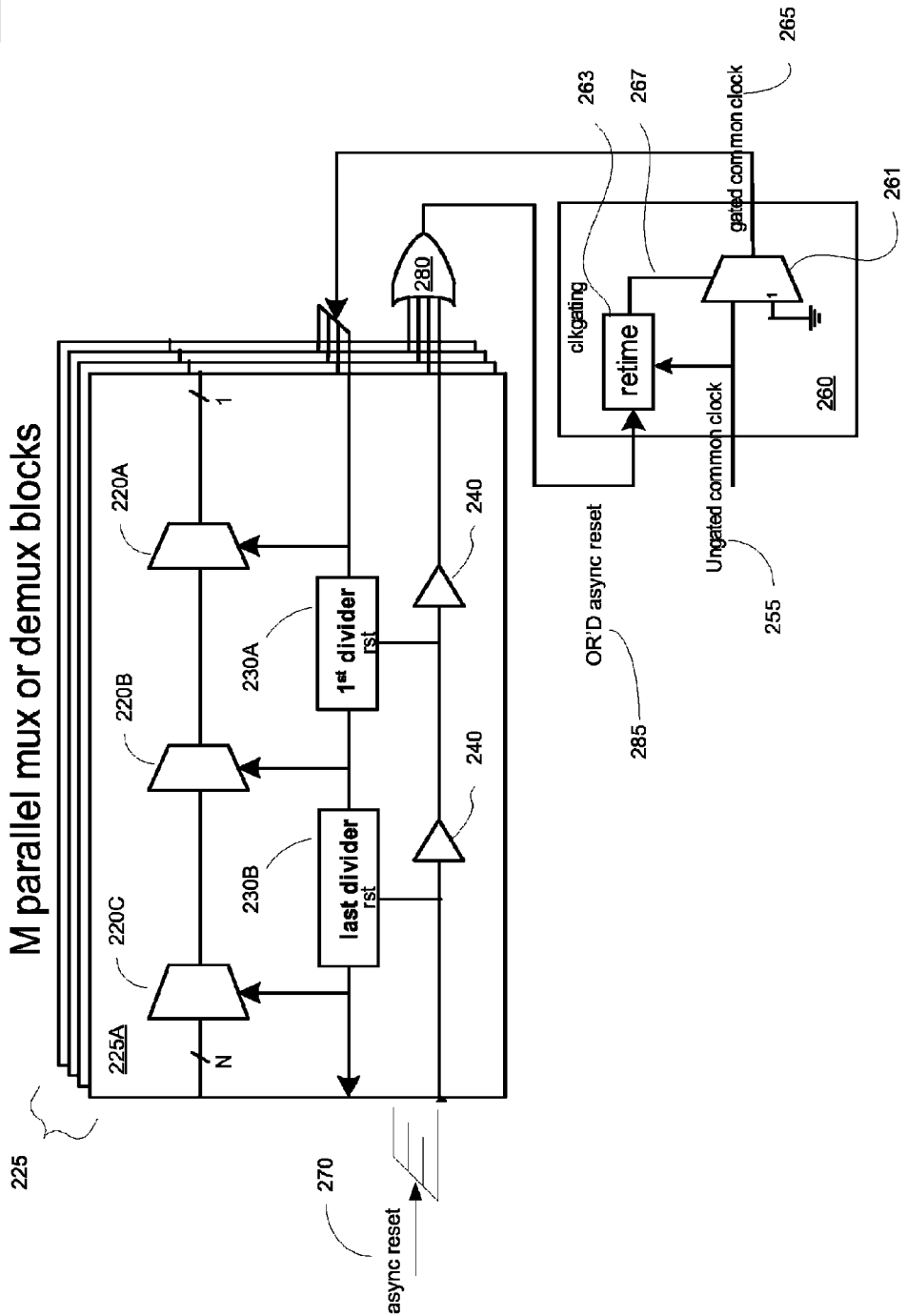
FIG. 2 is a circuit diagram of a reset circuit for resetting clock circuitry as implemented in a configuration including multiple multiplexor/demultiplexor circuits arranged in parallel, in accordance with one embodiment of the present disclosure.

FIG. 2 is a circuit diagram of a reset circuit 200 capable of resetting clock circuitry as implemented in a configuration including multiple multiplexor/demultiplexor circuits arranged in parallel, in accordance with one embodiment of the present disclosure. In one embodiment, reset circuit 200 is implemented within a multiplexor. In another embodiment, reset circuit 200 is implemented within a demultiplexor, wherein the multiplexor units in each of the multiplexor/demultiplexor parallel circuits shown in FIG. 2 are substituted with demultiplexor units.

Embodiments of the present invention as shown in FIG. 2 are disclosed within the context of integrated circuits providing communication systems using quadrature phase-shift keying to maintain bit alignment after multiplexing a number of parallel bit streams into a different number of parallel bit streams. Specifically, the reset circuit 200 is configured to reset the clocking circuitry (e.g., dividers) such that phase alignment of clocking circuitry, and in particular bit alignment is maintained within each pair of the parallel multiplexor blocks. That is, bit alignment is maintained after multiplexing is performed such that the parallel data output streams which drive the in-phase and quadrature-phase optics preserve the differential encoding which has been added to the data.

Though bit alignment is maintained between pairs of multiplexor blocks configured in parallel, embodiments of the present invention provide for bit alignment between any number of multiplexor/demultiplexor blocks configured in parallel. As such, reset circuit 200 provides as an advantage a modular approach that is scalable when implementing one or more multiplexor/demultiplexor blocks arranged in a parallel configuration, which results in the simplest, smallest, and lowest power implementation.

As shown in FIG. 2, reset circuit 200 includes a plurality of block circuits 225 arranged in parallel. For instance, the top most block circuit shown in FIG. 2 is block circuit 225A. Three other block circuits are also shown, such that two pairs of block circuits are able to carry differentially encoded data for quadrature phase-shift keying, as an example. Each block circuit is configured to receive an input of a first number of parallel bit streams and output a second number of parallel bit streams.

Each of the parallel block circuits 225 could be all multiplexors or demultiplexors. In one embodiment, reset circuit 200 is implemented within a multiplexor. For instance, the multiplexor may support a fiber optic communication system using quadrature phase-shift keying, such that differential encoding can be used to eliminate phase ambiguities at the receiver. The reset circuit 200 ensures that the parallel data output streams which drive the in-phase and quadrature-phase optics are bit aligned to maintain the differential encoding. In particular, embodiments of the present invention provides for the use of identical multiplexor macros (e.g., 225A) operating in parallel, wherein each multiplexor macro multiplexes lower-speed data into a single high-speed output. Each multiplexor macro (e.g., 225A) locally generates the multiple clocks (e.g., within each divider) required for the multiplexing operation.

In another embodiment, reset circuit 200 is implemented within a demultiplexor. For instance, a receiver with a decision feedback equalizer (DFE) generates data and error bit streams from the incoming serial data, and demultiplexes the data to a lower data rate for processing in a digital core. The correspondence between the data and error bits must be maintained at the lower data rate for proper operation of the algorithms which generate the DFE tap weights.

As shown in FIG. 2, block circuit 225A is representative of each of the plurality of block circuits 225. Specifically, block circuit 225A includes a chain of one or more cascading units, including units 220A-C. The chain may be configured with any number of units. Each cascading unit is configured to receive a number of parallel bit streams and output a different number of parallel bit streams. For instance, in one implementation, the chain of cascading units is configured as a multiplexor. As such, the "N" inputs would be inputted from the left side of the chain, go through the various multiplexing stages implemented by units 220A-C, and the "1" output would be presented on the right side of the chain 120. In another implementation, the chain of cascading units is configured as a demultiplexor, in which case the "1" input would be inputted from the right side of the chain, be processed by the various demultiplexing stages implemented by units 220A-C, and the "N" outputs would be outputted from the right side of the chain.

Reset circuit 225A also includes a chain of one or more dividers, including a first divider 230A and a last dividers 230B. The divider chain may be configured with any number of dividers. The one or more divided clock signals are based on a gated common clock signal 265 that is generated by a clock gating circuit 260. Each divider is configured to receive a clock signal of a first frequency characteristic, and generate a divided clock signal of a second and lower frequency characteristic. The generated divided clocks at each divider is delivered to a corresponding cascading unit. For instance, a gated common clock signal 265 is delivered to the first divider 230A and to the cascading unit 220A. The gated common clock signal 265 is of the highest frequency. The first divider 230A generates a divided clock signal of a lower frequency that is delivered to the cascading unit 220B and to the last divider 230B. The last divider 230B performs a similar function to generate a clock signal of an even lower frequency characteristic.

The reset circuit 200 includes and responds to an asynchronous reset signal 270 that is sent to each of the parallel multiplexor/demultiplexor blocks 225. The asynchronous reset signal 270 is asserted (e.g., HIGH) long enough to ensure it propagates through the entire chain of reset buffers (e.g., 240), so that all the clocking circuitry in the dividers is in a static or reset state, wherein the buffers 240 help maintain the quality of the asynchronous reset signal 270 and provide some propagation delay. In particular, as shown in block 225A, the asynchronous reset signal 270 when asserted (e.g., HIGH) sets each divider 230A-B in the chain of dividers to a reset state. As shown, the asynchronous reset signal 270 propagates through the corresponding chain of dividers from a downstream side, as referenced from the input of the gated common clock signal 265.

In that manner, the phases of the generated clock signals at each stage is the same across all the multiplexor/demultiplexor blocks. For instance, the clocks generated by the first dividers 230A in all the blocks 225 are bit aligned, and the clocks generated by the last dividers 230B in all the blocks 225 are bit aligned. Also, since it is the same clock signal, the gated common clock 265 that is distributed to the first multiplexor/demultiplexor cascading unit is phase aligned between all the blocks 225. As such, the parallel data output streams across all the blocks or across pairs of blocks are bit-aligned. For pairs of multiplexor blocks, reset circuit 200 ensures the parallel data output streams which drive the in-phase and quadrature-phase optics are bit-aligned.

As shown in FIG. 2, reset circuit 200 includes an OR logic gate 280 that is configured to receive a plurality of asynchronous reset signals exiting from the plurality of block circuits 225. The OR logic gate 280 outputs an OR'd asynchronous reset signal. Though reset circuit 200 shows an OR logic gate 280, other embodiments are well suited to implementing other logic gates for forwarding the asynchronous reset signal from the plurality of block circuit 225.

Reset circuit 200 also includes a clock gating circuit 260 for generating the gated common clock signal 265 that is based on the ungated common clock 255. The clock gating circuit 260 is coupled to the chain of one or more dividers 230A-B and to the first cascading unit 220A. More specifically, the clock gating circuit 260 is configured to hold the gated common clock signal 265 in a static position (e.g., LOW) while the asynchronous reset signal is asserted (e.g., HIGH). Also, the clock gating circuit 260 is configured to provide the released gated common clock signal 265 to the chain of one or more dividers 230A-B when the asynchronous reset signal 270 is de-asserted (e.g., LOW). As shown, the gated common clock signal 265 is delivered on the upstream side of the chain of dividers 230A-B. Moreover, the reset circuit 200 is designed to release the gated common clock signal 265 after all the dividers in all the blocks 225 have come out of their corresponding reset states.

In one embodiment, the propagation of the de-asserted asynchronous reset signal 270 is such that the downstream dividers in all the blocks 225 come out of its corresponding reset state first, or before the upstream dividers. In addition, the clock gating circuit 260 is guaranteed to be the final block to come out of its reset state. A more detailed description of the operations of the reset circuit 200 is provided in the timing diagram 300 of FIG. 3.

The clock gating circuit 260 includes a retiming circuit 263 that retimes the asynchronous reset signal 270 using the ungated common clock signal 255 in such a way to guarantee a known timing relationship between the ungated common clock signal 255 and the retimed reset signal 267. In that manner, there is no glitch in the gated common clock signal 265 when the asynchronous reset signal 270 is released. In that manner, when the retimed reset signal is de-asserted, gated common clock signal will not be distorted. In particular, the retimed asynchronous reset signal is de-asserted to give the clock gating circuit 260, and more specifically the logic unit 261 (e.g., multiplexor), sufficient set-up time for releasing the gated common clock signal 265 on a rising edge of the ungated common clock 255. This ensures that the first HIGH portion of the waveform that is generated for the gated common clock signal 265 is full.

The logic unit 261 delivers the gated common clock signal 265 to the first divider 230A and the first multiplexor 220A when the retimed asynchronous reset signal is de-asserted (e.g., LOW), as previously described. In particular, the gated common clock signal 265 is provided to the first cascading unit 220A and to the first divider 230A. the first divider generates a lower frequency, divided clock signal to the last divider 230B, and to a second cascading unit 220B that is coupled to receive data signals from the first cascading unit 220A. the last divider 230B performs a similar function as the first divider 230A and delivers an even lower frequency, divided clock signal to the third cascading unit 220C that is coupled to the second cascading unit 220B to receive data signals.

Figure 3:
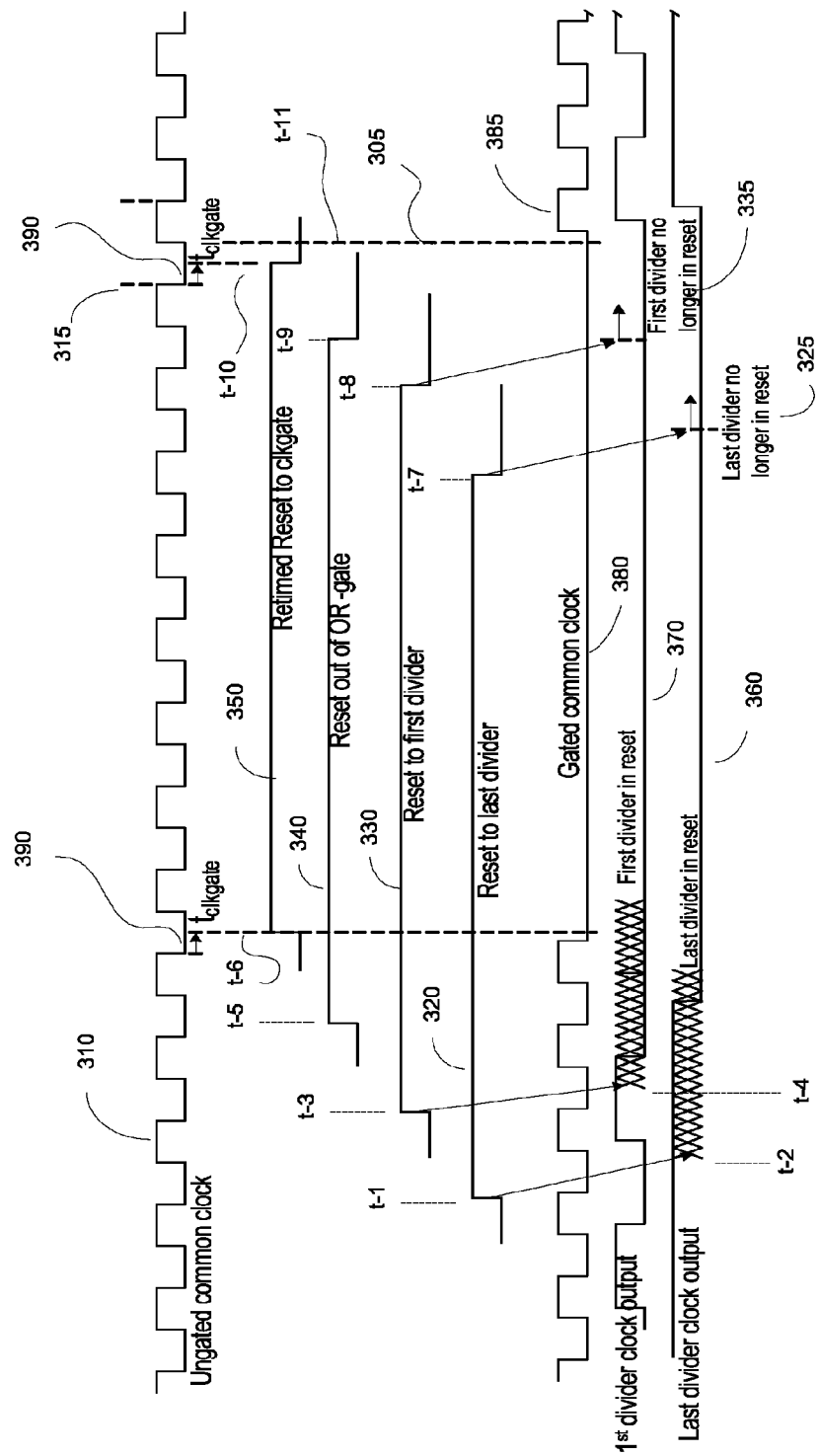
FIG. 3 is a timing diagram illustrating timing waveforms associated with a reset scheme implemented in a circuit configuration including multiple multiplexor/demultiplexor circuits arranged in parallel, in accordance with one embodiment of the present disclosure.

FIG. 3 is a timing diagram 300 illustrating timing waveforms associated with a reset scheme implemented in a circuit configuration including one or more multiplexor/demultiplexor circuits or blocks arranged in parallel, in accordance with one embodiment of the present disclosure. The timing diagram 300 is representative of the signals implemented within reset circuits 100 and 200 of FIGS. 1 and 2, respectively. The reset circuits are implemented to reset the clocks generated at each stage (e.g., divider) of a multiplexing/demultiplexing block to the same state in each of the parallel multiplexing/demultiplexing blocks, and is based on a gated common clock shown by waveform 380, which is formed from the ungated common clock shown by waveform 310.

As shown in FIG. 3, the asynchronous reset signal is represented by waveform 320. At time t-1, the asynchronous reset signal is asserted HIGH. The asynchronous reset signal resets the dividers as it propagates through the chain of dividers in each block of multiplexor/demultiplexor. For instance, as shown by waveform 360, the clock output from the last divider starts to reset at time t-2 (after a delay from time t-1) before the first divider starts to reset at time t-4 (after a delay from time t-3). Both clocks in waveforms 360 and 370 are guaranteed to be static LOW after some period (indicated by the crosshatch). As such, all the clocking circuitry in all the blocks are now static.

The asynchronous reset signal reaches the OR gate in a circuit with multiple, parallel multiplexor/demultiplexor blocks at time t-5. As such, the asynchronous reset signal is delivered to the clock gating circuit. After propagation and operation delays, the gated common clock from the clock gating circuit is held static at time t-6.

The asynchronous reset is de-asserted (e.g., LOW) after a period that, when asserted, is long enough to ensure it propagates throughout all the clock circuitry in the one or more multiplexor/demultiplexor blocks configured in parallel. The propagation of the de-asserted asynchronous reset signal is such that downstream dividers come out of reset first. For instance at time t-7, the de-asserted asynchronous reset signal reaches the last divider, and the last divider comes out of reset. After an operational delay at point 325 the last divider is fully out of reset, and is waiting for a input clock signal to begin generating a divided clock signal. Thereafter, at time t-8, the first divider comes out of reset. After an operational delay, at point 335, the first divider is fully out of reset, and waits for an input clock signal to begin outputting a divided clock signal.

The de-asserted asynchronous reset signal reaches the OR gate output at time t-9. The clock gating circuit is guaranteed to be the final block to come out of reset. In one embodiment, this is accomplished through the logic gate (e.g., OR logic) receiving the asynchronous reset signals from each of the multiplexor/demultiplexor blocks. In particular, the OR'd de-asserted asynchronous reset signal is retimed by the retiming circuit on clock edge 315 and reaches the clock gating circuit at time t-10. The OR'd de-asserted asynchronous reset signal is retimed to guarantee a known timing relationship with the ungated common clock, to ensure there are no glitches in the gated common clock upon release of the reset signal. This guarantees that the retimed reset signal as shown in waveform 350 is released while the ungated common clock is LOW as shown at point 390. That is, the retimed asynchronous reset signal is released after a defined amount of time (e.g., t-clk-gate) after the falling edge of the ungated common clock signal, shown at point 315. This provides for sufficient set up time by the clock gating circuit to recognize the retimed de-asserted reset signal prior to the ungated clock rising edge at time t-11. In this manner, the gated common clock generates a full HIGH portion of its corresponding waveform after time t-11.

The gated common clock is delivered to the chain of dividers in each of the multiplexor/demultiplexor blocks at the same time (within some small error due to differences in propagation times). Because all the dividers of a particular multiplexing/demultiplexing stage across all the multiplexing/demultiplexing blocks are in a reset state and receive an input clock signal at approximately the same time, the output clock signals of the corresponding dividers at each stage will be phase aligned. For example, the first dividers in each of the multiplexing/demultiplexing blocks will output its clock signal as shown by waveform 370 after time t-11 with consideration of a propagation delay for the gated common clock. Thereafter, the last dividers in each of the multiplexing/demultiplexing blocks will output its clock signal as shown in waveform 360 after time t-11 with consideration of a longer propagation delay for the gated common clock.

Figure 4:
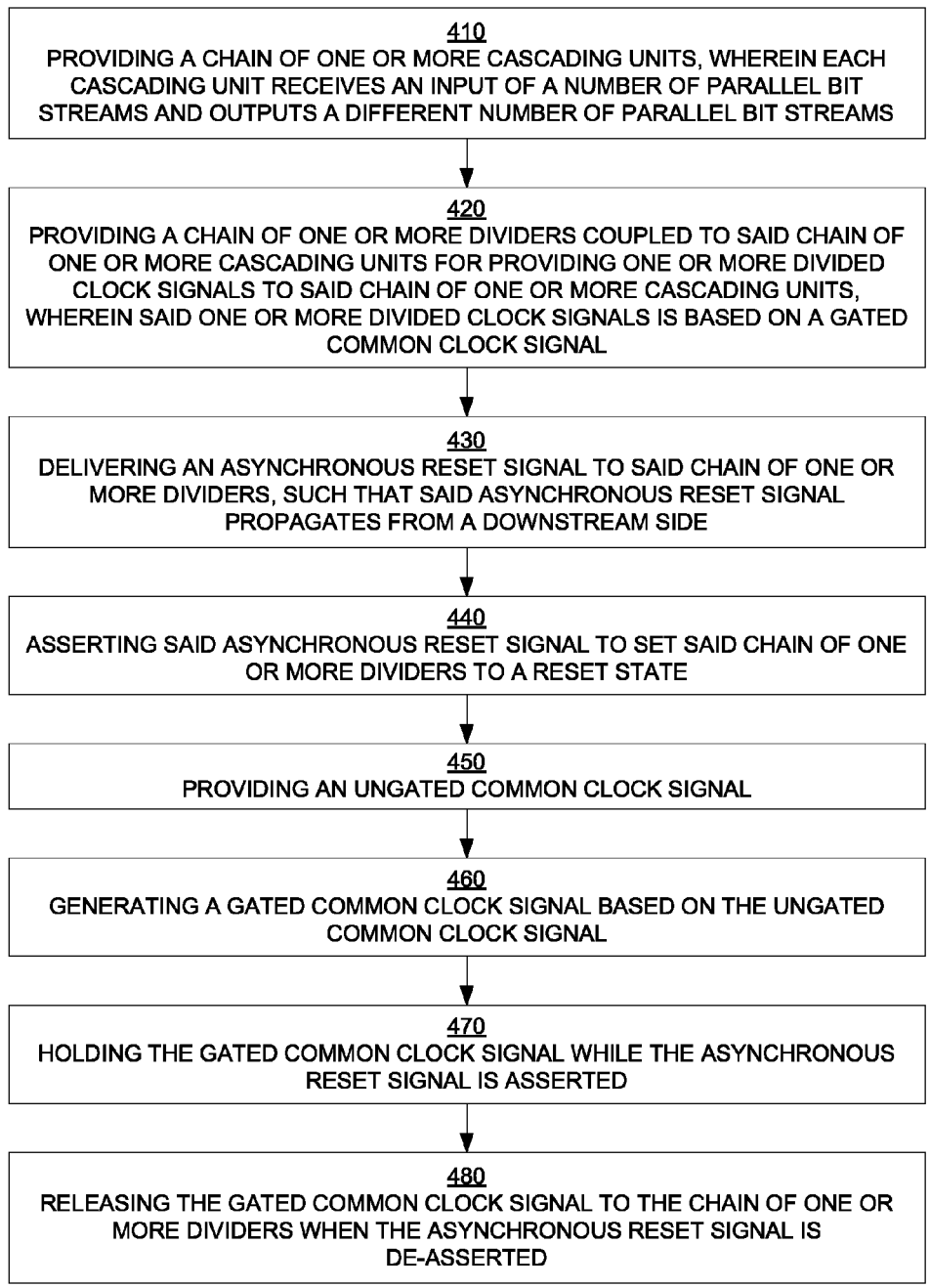
FIG. 4 is a flow diagram illustrating a method for resetting clock circuitry in a multiplexor/demultiplexor circuit, in accordance with one embodiment of the present disclosure.

FIG. 4 is a flow diagram 400 of a process used for resetting clock circuitry as implemented within a multiplexor/demultiplexor circuit (e.g., single multiplexor/demultiplexor block, or multiple multiplexor/demultiplexor blocks configured in parallel), in accordance with one embodiment of the present disclosure. In this manner, the method of flow diagram 400 is implemented to reset the clocking circuitry in a multiplexor block to a reset or known stage before beginning to deliver a clock signal. In that manner, the phase of a corresponding clock signal in a multiplexor/demultiplexor stage is known, and also, clock signals between corresponding multiplexor/demultiplexor stages of a pair or more multiplexor/demultiplexor blocks configured in parallel are bit aligned. The method of flow diagram 400 is implementable as circuits 100 and 200, of FIGS. 1 and 2, in embodiments.

At 410, the method includes providing a chain of one or more cascading units. Each of the cascading units receives an input of a number of parallel bit streams and outputs a different number of parallel bit streams. For instance, the cascading units are implemented as stages of multiplexors within a multiplexor block, in one embodiment. In another embodiment, the cascading units are implemented as stages of demultiplexors within a demultiplexor block.

At 420, the method includes providing a chain of one or more dividers coupled to the chain of one or more cascading units. The dividers provide one or more divided clock signals to the chain of one or more cascading units. The divided clock signals are based on a gated common clock signal as generated by a clock gating circuit, in one implementation. For instance, each divider is configured to divide an input clock signal of a first frequency characteristic, and generate a divided clock signal of a lower, second frequency characteristic. The generated divided clock signals for each divider is delivered to a corresponding cascading unit.

At 430, the method includes delivering an asynchronous reset signal to the chain of one or more dividers. At 440, the method includes asserting the asynchronous reset signal at 440 to set the dividers into a reset state. The asynchronous reset signal propagates through the chain of dividers, such that the circuitry within the dividers are put into a reset state. The asynchronous reset signal is asserted for a period long enough to ensure that all dividers return to a reset state.

At 450, the method includes providing an ungated common clock signal. For instance, a clock source is configured to provide the ungated common clock signal. At 460, the method includes generating a gated common clock signal based on the ungated common clock signal. More particularly, the method includes at 470, holding the gated common clock signal in a static position (e.g., LOW) while the asynchronous reset signal is asserted. This is accomplished through clock gating circuitry.

Also, the method includes at 480 releasing the gated common clock signal to the chain of one or more dividers, in each of the multiplexor/demultiplexor blocks configured singly or in parallel, when the asynchronous reset signal is de-asserted (e.g., LOW). In one embodiment, the method includes generating a retimed reset signal, such that the gated common clock will not be distorted when it is released from reset. In particular, the retimed reset signal is de-asserted with sufficient set-up time relative to the rising edge of the ungated common clock. This ensures that the gated common clock has a full HIGH portion once it starts toggling.

The method further includes providing the gated common clock signal to a first cascading unit in a chain of cascading units, and to a first divider in the chain of one or more dividers. The first divider is configured to provide a divided clock signal to a second cascading unit that is coupled to receive data signals from the first cascading unit.

Figure 5:
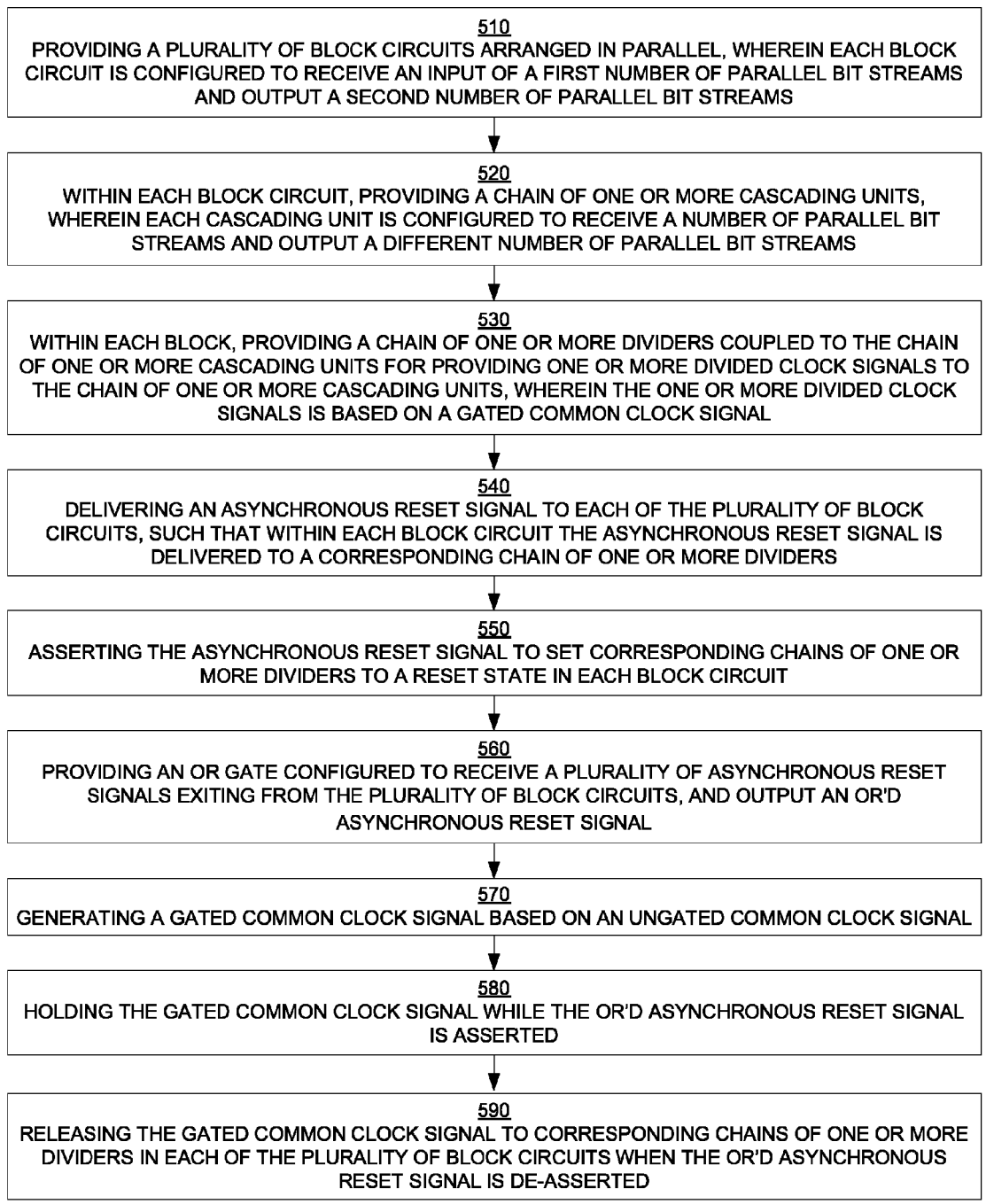
FIG. 5 is a flow diagram illustrating a method for resetting clock circuitry in multiple multiplexor/demultiplexor circuits arranged in a parallel configuration, in accordance with one embodiment of the present disclosure.

FIG. 5 is a flow diagram 500 of a process used for resetting clock circuitry as implemented within multiple multiplexor/demultiplexor circuits or blocks arranged in parallel, in accordance with one embodiment of the present disclosure. In this manner, the method of flow diagram 500 is implemented to align clock signals between corresponding multiplexor/demultiplexor stages of a pair or more multiplexor/demultiplexor blocks so that the outputs from the blocks are bit aligned. The method of flow diagram 500 is implementable as circuits 100 and 200 of FIGS. 1 and 2, respectively in embodiments.

At 510, the method includes providing a plurality of block circuits arranged in parallel. Each block circuit is configured to receive an input of a first number of parallel bit streams and output a second number of parallel bit streams. For instance, each block circuit is configured as a multiplexor for purposes of reducing the number input bit streams, in one embodiment. In another instance, each block circuit is configured as a demultiplexor for purposes of increasing the number of input bit streams in one embodiment.

At 520, the method includes providing a chain of one or more cascading units within each block circuit, wherein each cascading unit receives an input of a number of parallel bit streams and outputs a different number of parallel bit streams. For instance, in a multiplexor block circuit, corresponding cascading units are implemented as stages of multiplexors. Also, in a demultiplexor block circuit, corresponding cascading units are implemented as stages of demultiplexors.

At 530, the method includes providing a chain of one or more dividers coupled to a corresponding chain of one or more cascading units in each block circuit. The dividers in a block circuit provide one or more divided clock signals to the corresponding chain of one or more cascading units. The divided clock signals are based on a gated common clock signal as generated by a clock gating circuit, in one implementation. For instance, each divider is configured to divide an input clock signal of a first frequency characteristic, and generate a divided clock signal of a lower, second frequency characteristic. The generated divided clock signals for each divider in a corresponding block circuit is delivered to a corresponding cascading unit.

At 540, the method includes delivering an asynchronous reset signal to each of the plurality of block circuits. As such, within each block circuit, the asynchronous reset signal is delivered to a corresponding chain of one or more dividers.

At 550, the method includes asserting the asynchronous reset signal to set corresponding chains of one or more dividers in each block circuit into a reset state. The asynchronous reset signal propagates through corresponding chains of dividers, such that the circuitry within the dividers are put into a reset state. The asynchronous reset signal is asserted for a period long enough to ensure that all dividers in each of the plurality of block circuits return to a reset state.

At 560, the method includes providing an OR logic gate that is configured to receive a plurality of asynchronous reset signals from the plurality of block circuits. As such, an OR'd asynchronous reset signal is generated.

At 570, the method includes generating a gated common clock signal based on an ungated common clock signal and the OR'd asynchronous reset signal. In particular, at 580, the method includes holding the gated common clock signal in a static position (e.g., LOW) while the OR'd asynchronous reset signal is asserted. This is accomplished through clock gating circuitry, in one embodiment.

At 580, the method includes releasing the gated common clock signal to corresponding chains of one or more dividers in each of the plurality of block circuits when the OR'd asynchronous reset signal is de-asserted (e.g., LOW). In one embodiment, the method includes generating a retimed OR'd de-asserted reset signal, such that the gated common clock will not be distorted when it is released from reset. In particular, the retimed reset signal is de-asserted with sufficient set-up time relative to the rising edge of the ungated common clock. This ensures that the gated common clock has a full HIGH portion once it starts toggling.

Thus, according to embodiments of the present disclosure, circuits and methods are disclosed that provide for resetting of multiplexor/demultiplexor block outputs to known states, resulting in bit alignment between outputs of multiplexor/demultiplexor blocks configured in parallel.

While the foregoing disclosure sets forth various embodiments using specific block diagrams, flow diagrams, and examples, each block diagram component, flow diagram step, operation, and/or component described and/or illustrated herein may be implemented, individually and/or collectively. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

The invention claimed is:

1. A circuit comprising:
a chain of one or more cascading units, wherein each cascading unit receives an input of a number of parallel bit streams and outputs a different number of parallel bit streams;
a chain of one or more dividers coupled to said chain of one or more cascading units for providing one or more divided clock signals to said chain of one or more cascading units, wherein said one or more divided clock signals is based on a gated common clock signal;
an asynchronous reset signal delivered to said chain of one or more dividers, and when asserted sets said chain of one or more dividers to a reset state, wherein said asynchronous reset signal propagates through said chain or one or more dividers from a downstream side;
a clock source providing an ungated common clock signal;
a clock gating circuit configured for generating said gated common clock signal based on said ungated common clock signal, and configured to hold said gated common clock signal while said asynchronous reset signal is asserted, wherein said clock gating circuit is configured to provide said gated common clock signal to said chain of one or more dividers when said asynchronous reset signal is de-asserted;
a retiming circuit configured to receive said ungated common clock signal and said reset asynchronous reset signal, wherein said retiming circuit generates a retimed reset signal that is de-asserted such that the gated common clock signal starts up undistorted after being released from reset.

2. The circuit of claim 1, wherein said asynchronous reset signal is asserted for a period such that all clocking circuitry in said chain of one or more dividers returns to said reset state.

3. The circuit of claim 1, wherein said retimed reset signal is de-asserted with sufficient set-up time for releasing said gated common clock signal on a rising edge of said ungated common clock.

4. The circuit of claim 1, wherein said clock gating circuit is configured to release said gated common clock after all dividers in said chain of one or more dividers have come out of said reset state.

5. The circuit of claim 1, wherein said clock gating circuit is coupled to said chain of one or more dividers such that said gated common clock signal is provided on an upstream side of said one or more dividers.

6. The circuit of claim 1, wherein said chain of one or more cascading units is configured as a multiplexor or demultiplexor.

7. The circuit of claim 1, wherein said gated common clock signal is provided to a first cascading unit and to a first divider in said chain of one or more dividers, and wherein said first divider provides a divided clock signal to a second cascading unit that is coupled to receive data signals from said first cascading unit.

8. A circuit comprising:
a plurality of block circuits arranged in parallel, wherein each block circuit is configured to receive an input of a first number of parallel bit streams and output a second number of parallel bit streams, wherein each block comprises:
a chain of one or more cascading units, wherein each cascading unit is configured to receive a number of parallel bit streams and output a different number of parallel bit streams; and
a chain of one or more dividers coupled to said chain of one or more cascading units for providing one or more divided clock signals to said chain of one or more cascading units, wherein said one or more divided clock signals is based on a gated common clock signal;
an asynchronous reset signal delivered to each of said plurality of block circuits, such that within each block circuit said asynchronous reset signal is delivered to a corresponding chain of one or more dividers, and when asserted sets said corresponding chain of one or more dividers to a reset state, wherein said asynchronous reset signal propagates through said corresponding chain or one or more dividers from a downstream side and exits from an upstream side;

an OR gate configured to receive a plurality of asynchronous reset signals exiting from said plurality of block circuits, and output an OR'd asynchronous reset signal;

a clock gating circuit configured for generating said gated common clock signal based on said ungated common clock signal, and configured to hold said gated common clock signal while said OR'd asynchronous reset signal is asserted, wherein said clock gating circuit is configured to provide said gated common clock signal to corresponding chains of one or more dividers in each of said block circuits when said OR'd asynchronous reset signal is de-asserted.

9. The circuit of claim 8, wherein said plurality of block circuits comprises a pair of block circuits transmitting differentially encoded data.

10. The circuit of claim 8, wherein said clock gating circuit further comprises:

a retiming circuit configured to receive said ungated common clock signal and said OR'd asynchronous reset signal, wherein said retiming circuit generates a retimed reset signal that is de-asserted such that the gated common clock signal starts up undistorted after being released from reset.

11. The circuit of claim 10, wherein said retimed asynchronous reset signal is de-asserted with sufficient set-up time for releasing said gated common clock signal on a rising edge of said ungated common clock.

12. The circuit of claim 10, wherein said asynchronous reset signal is asserted for a period such that all clocking circuitry in each of said chain of one or more dividers returns to said reset state, and wherein said clock gating circuit is configured to release said gated common clock after all dividers in a corresponding chain of one or more dividers have come out of said reset state.

13. The circuit of claim 8, wherein said clock gating circuit is coupled to a corresponding chain of one or more dividers such that said gated common clock signal is provided to a divider on an upstream side.

14. The circuit of claim 8, wherein each of said plurality of block circuits is configured as a multiplexor or demultiplexor.

15. The circuit of claim 8, wherein said gated common clock signal is provided to a first cascading unit and to a first divider in a corresponding chain of one or more dividers, and wherein said first divider provides a divided clock signal to a second cascading unit that is coupled to receive data signals from said first cascading unit.

16. A method of clock synchronization, comprising:

receiving an input of a first number of parallel bit streams and output a second number of parallel bit streams;

receiving a number of parallel bit streams and output a different number of parallel bit streams;

generating one or more divided clock signals to said chain of one or more cascading units, wherein said one or more divided clock signals is based on a gated common clock signal;

transmitting an asynchronous reset signal to each of said plurality of block circuits, such that within each block circuit said asynchronous reset signal is delivered to a corresponding chain of one or more dividers;

asserting said asynchronous reset signal to set corresponding chains of one or more dividers to a reset state in each block circuit;

receiving a plurality of asynchronous reset signals exiting from said plurality of block circuits, and outputting an OR'd asynchronous reset signal;

generating a gated common clock signal based on an ungated common clock signal;

holding said gated common clock signal while said OR'd asynchronous reset signal is asserted; and releasing said gated common clock signal to corresponding chains of one or more dividers in each of said plurality of block circuits when said OR'd asynchronous reset signal is de-asserted.

17. The method of claim 16, further comprising:

retiming said OR'd asynchronous reset signal to generate a retimed reset signal; and de-asserting said retimed reset signal with sufficient set-up time for releasing said gated common clock signal while said ungated common clock is LOW, and after all dividers in said chain of one or more dividers have come out of said reset state.

18. The method of claim 16, further comprising:

within a corresponding block circuit, providing said gated common clock signal to a first cascading unit and to a first divider in a corresponding chain of one or more dividers, such that said first divider is configured to provide a divided clock signal to a second cascading unit that is coupled to receive data signals from said first cascading unit.

19. The method of claim 16, wherein said plurality of block circuits are configured as a multiplexor or demultiplexor.

* * * * *